M. DYBA.
NUT LOCK.
APPLICATION FILED MAR. 21, 1914.
1,134,520.
Patented Apr. 6, 1915.
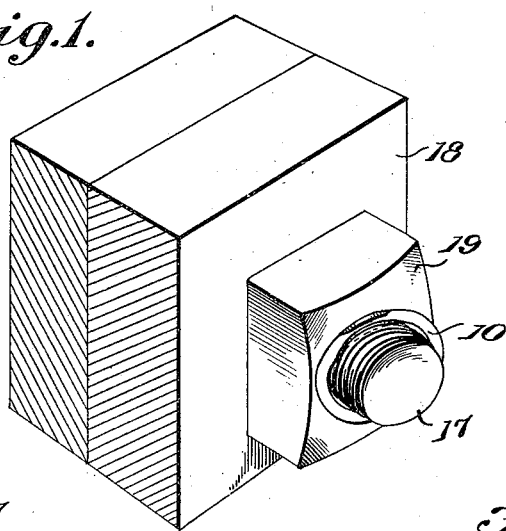
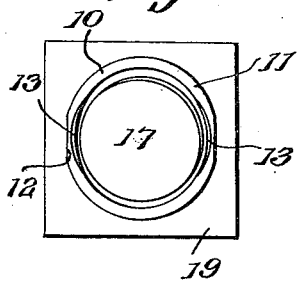
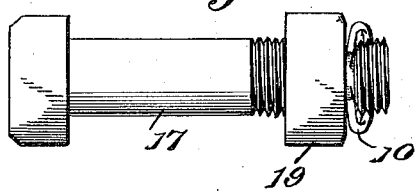
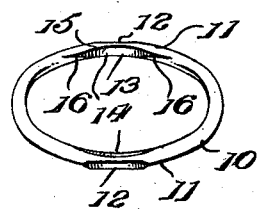
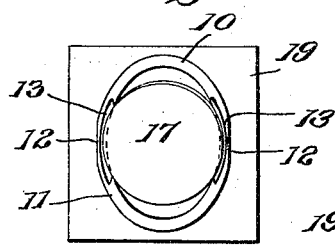
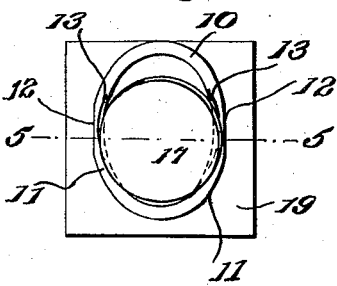
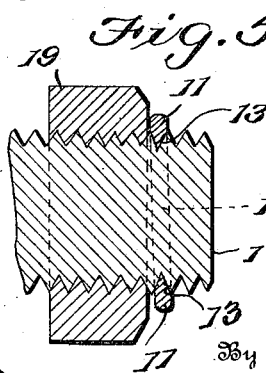
Inventor
M. Dyba.

UNITED STATES PATENT OFFICE.

MARTIN DYBA, OF OAKDALE, IOWA.

NUT-LOCK.

1,134,520.  Specification of Letters Patent.  Patented Apr. 6, 1915.

Application filed March 21, 1914. Serial No. 826,263.

*To all whom it may concern:*

Be it known that I, MARTIN DYBA, citizen of the United States, residing at Oakdale, in the county of Johnson and State of Iowa, have invented certain new and useful Improvements in Nut-Locks, of which the following is a specification.

This invention relates to nut locks and more particularly to an improved ring so constructed as to be adapted to engage threads of an ordinary bolt being applied to the bolt exteriorly of the nut to prevent retrograde movement thereof.

The invention has as its primary object to provide a device of the above described character which may be readily applied and which, even though the threads of the bolt have become rusted may be removed with equal facility.

The invention has as a further object to provide a locking ring so constructed that retrograde movement of the nut against the ring will cause the ring to move transversely upon the bolt, the ring being provided with oppositely disposed pairs of oppositely inclined faces upon each side thereof adapted to wedge between confronting faces of adjacent threads of the bolt upon transverse movement of the ring, to thus effectually engage the bolt and prevent retrograde movement of the nut.

A further object of the invention is to provide a device for the purpose set forth wherein a flexible locking ring is employed which may be bent to effect its adjustment to accommodate bolts of various diameters and which may be bent to free the working faces of the ring from the bolt. And a still further object of the invention is to generally improve the construction and increase the efficiency of devices of the above described character.

With these and other objects in view my invention will be more fully described, illustrated in the accompanying drawings, and then specifically pointed out in the claims which are attached to and form a part of this application.

In the drawings—Figure 1 is a perspective view showing my improved locking ring in operative position upon a bolt, the bolt and nut being conventionally shown, Fig. 2 is a side elevation more particularly showing the angular disposition of the locking ring upon the bolt, the bolt being conventionally shown, Fig. 3 is a top plan view showing the ring medially disposed upon the bolt prior to engagement by the nut, the bolt and the nut being conventionally shown, Fig. 4 is a similar view showing the disposition of the ring when engaged by the nut in its retrograde movement, Fig. 5 is a vertical sectional view taken on the line 5—5 of Fig. 4 showing the double beveled cam faces of the ring in engagement with the walls of the threads of the bolt, Fig. 6 is a top plan view showing the ring bent to disengage the working faces of the ring upon the threads of the bolt, Fig. 7 is a detail perspective view of the locking ring, and Fig. 8 is a longitudinal sectional view showing one side portion of the ring and the disposition of the angularly disposed faces formed thereon.

Corresponding and like parts are referred to in the following description and indicated in all the views of the drawings by the same reference characters.

In carrying out my invention I employ a substantially elliptical ring 10, which is preferably formed of suitable malleable metal and which throughout the greater portion of its length is substantially circular in cross-section. The outer walls of the side portions 11 of the ring are formed with straight faces 12 to facilitate the engagement of a wrench with the ring.

Medially formed upon the inner confronting faces of the side portions 11 of the ring are oppositely disposed working faces 13, the metal forming the ring being cut-away to form the medially disposed edge 14 upon each side of the ring, from which edge the side walls 15 of each working face diverge.

The working faces 13 extend longitudinally of the side portions 11 of the ring and diverge outwardly toward the extremities of each working face from a point medially thereof, the extremities of the walls of each working face being contracted upon each side of the ring as shown at 16. Oppositely disposed wedging faces are thus presented upon each side of the transverse medial line of each working face 13, said wedging faces each having double beveled walls diverging transversely of the working faces 13 and longitudinally thereof in opposite directions. To describe the construction disclosed in other words, it may be stated that applicant's device includes a ring member formed with opposed working faces adapted to engage the threads of a bolt, the angle between said working faces increasing from the medial point to the ends thereof thus forming said working faces into a wedge longitudinally thereof at each side of said medial point.

It is to be understood that the locking ring 10 may be of any desired size but is preferably made of a relative size as shown in the drawings according to the diameter of the bolt to which it is desired to attach the ring. The ring being constructed of pliable metal may be adjusted transversely to so space the inner edges 14 of the working faces 13 to engage the threads of the bolt. However, in constructing my improved locking ring it is intended that the elliptical configuration thereof shall be preserved for a reason which will presently appear.

In Fig. 1 of the drawings I have shown the locking ring 10 in operative position upon a bolt; the bolt being conventionally illustrated at 17 as extending through the work 18; and carrying at its threaded extremity the nut 19. It will be understood that the nut 19 is first screwed down upon the bolt to engage the work in the usual manner. The locking ring 10 is then screwed down upon the bolt exteriorly of the nut to engage the nut, the working faces 13 of the locking ring engaging the threads of the bolt.

It will be noted that when in operative position, the locking ring 10 is disposed in angular relation to the adjacent face of the nut, the ring engaging the nut at one side thereof. The working faces 13 extend longitudinally of the side portions 11 of the ring, permitting the ring to move longitudinally upon the bolt, the side portions 11 of the ring being adjusted to permit such movement. Thus, retrograde movement of the nut engaging the ring at one side thereof will cause the ring to be moved longitudinally upon the bolt forcing the adjacent cam faces formed at one extremity of each of the working faces 13 into wedging engagement with the confronting walls of the adjacent threads. This is best shown in Fig. 4 of the drawings. The ring is thus caused to effectually engage the bolt to prevent retrograde movement of the nut and it is to be noted that the working faces of the ring are so formed as to bear against the confronting faces of adjacent threads upon both sides of the bolt. This is an especial feature of advantage in my invention in that the relatively small working faces of the ring are caused to frictionally and positively engage a relatively large area presented by the confronting faces of adjacent threads. Consequently, a ring constructed in accordance with my invention may be made relatively light without imparing its efficiency in use.

Attention is here called to the fact that my improved locking ring is preferably constructed of relatively soft metal and in thus wedging the cam faces of the ring between the walls of the threads, severe retrograde movement of the nut will tend to mutilate said faces of the ring to thus further bring them into binding contact with the bolt. The bolt contacting with the ring at one side thereof would normally tend, in its retrograde movement to cause the locking ring to fulcrum upon the bolt forcing the upper wall of one of the working faces of the locking ring into engagement with one adjacent wall of one of the threads and forcing the lower wall of the opposite working face of the locking ring down against one corresponding wall of an adjacent thread on the opposite side of the bolt. Thus, the locking ring under such conditions would be caused to engage only one wall of each adjacent thread on each side of the bolt to thus inefficiently engage the bolt, the strain upon the locking ring being such under the conditions stated as to make it necessary to construct the locking ring relatively heavy and of rigid material. In forming my improved locking ring with oppositely disposed cam faces at each extremity of each working face of the ring and providing a construction whereby the ring is caused to move longitudinally upon the bolt by any retrograde movement of the nut, such cam faces are caused to engage confronting faces of adjacent threads upon each side of the bolt and thus lockingly engage the bolt, said cam faces becoming wedged between the walls of the threads. The tendency of the locking ring to fulcrum upon the bolt is thus overcome and consequently my improved locking ring may be made relatively light since the strain upon the ring is exerted longitudinally thereof against said cam faces.

When it is desired to remove the locking ring from the bolt, the ring may be compressed at its ends thus forcing the working faces 13 away from each other out of engagement with the threads of the bolt, the side portions 11 of the ring being weakened and being thus caused to spread away from each other. This is best shown in Fig. 6 of the drawings. Thus, the ring may be readily detached from the bolt and this feature of my invention is of obvious advantage in that even though the threads of the bolt have become rusted, quick removal of the locking ring 10 may be effected.

Having thus described my invention what is claimed as new is:

1. A device of the character described including a member formed with opposed wedging faces adapted to engage the threads of a bolt, said faces converging longitudinally of the member toward opposite ends thereof and in a plane with the member and diverging upon each side of the transverse medial line of the member longitudinally thereof in a plane substantially at right angles to the plane of the member.

2. A device of the character described including a pliable elliptical member, said member being formed with oppositely disposed longitudinally extending transversely beveled faces, the member being adapted for longitudinal movement upon a bolt and having wedging faces formed at adjacent extremities of each of said first mentioned faces, the wedging faces upon each side of the member and upon each side of the transverse medial line thereof diverging longitudinally of the member in a plane substantially at right angles to the plane of the member and being disposed to lock between the threads of the bolt upon longitudinal movement of the member thereon.

3. A device of the character described including a ring member formed with opposed working faces adapted to engage the threads of a bolt, the angle between said working faces increasing from the medial point to the ends thereof and thus forming said working faces into a wedge longitudinally thereof at each side of said medial point.

In testimony whereof I affix my signature in presence of two witnesses.

MARTIN DYBA. [L. S.]

Witnesses:
JOHN J. CORBETT,
ED PAUL.

Copies of this patent may be obtained for five cents each, by addressing the "Commissioner of Patents, Washington, D. C."